Patented Oct. 1, 1929

1,730,209

UNITED STATES PATENT OFFICE

ERWIN HOFFA, HANS HEYNA, AND FRITZ MÜLLER, OF HOCHST-ON-THE-MAIN, GERMANY, ASSIGNORS TO GENERAL ANILINE WORKS, INC., OF NEW YORK, N. Y., A CORPORATION OF DELAWARE

INDIGOID DYESTUFF AND PROCESS OF PREPARING THE SAME

No Drawing. Application filed November 30, 1926, Serial No. 151,824, and in Germany December 4, 1925.

Our present invention relates to new indigoid dyestuffs and a process of preparing the same. More particularly it relates to the indigoid dyestuffs of the general formula:

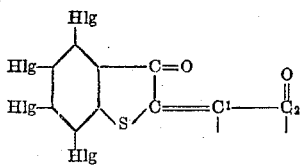

wherein Hlg stands for a halogen and $C^1$ and $C^2$ represent carbon atoms belonging to the residue of acyclic ortho-diketone.

Our new vat dyestuffs are obtainable by condensing a 4.5.6.7-tetrahalogen-3-hydrooxy-1-thionaphthene of the formula:

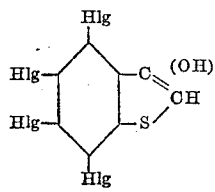

with a cyclic ortho-diketone, as for instance with an insatin or a 2.3-diketodihydrothionaphthene or a substitution product or a reactive α-derivative thereof. The products thus obtainable may, if necessary, be further halogenated.

The following examples serve to illustrate our invention, but they are not intended to limit it thereto, all parts being by weight:

1. A suspension of 15 parts of 4.5.6.7-tetrachlor-3-hydroxy-1-thionaphthene in 30 parts of benzene is added to a solution of 5.7-dichlorisatin-α-chloride prepared from 11 parts of 5.7-dichlorisatin, 50 parts of benzene and 11 parts of phosphorus pentachloride. After having heated the mixture for a short time the condensation is finished. The product is filtered and washed with benzene. The dyestuff thus obtainable corresponds most probably to the following formula:

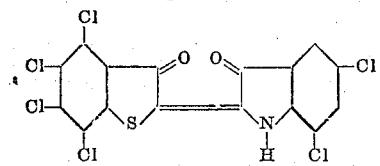

It forms a violet powder and dissolves in concentrated sulfuric acid to a blue solution. It dyes cotton a violet tint of excellent properties as to fastness.

2. 14,4 parts of 4.5.6.7-tetrachlor-3-hydroxy-1-thionaphthene are heated to boiling in 150 parts of glacial acetic acid with 11 parts of 5.7-dichlorisatin and 2 parts of concentrated hydrochloric acid. As soon as the formation of the dyestuff is complete, the mass is cooled to 30–40° C. and the dyestuff is separated from the glacial acetic acid. It forms a brown powder which is soluble in hot concentrated surfuric acid to a brown solution and dyes cotton fast brown tints. Most probably it corresponds to the following formula:

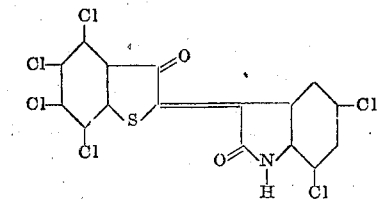

3. 26 parts of 4.5.6.7-tetrachlor-3-hydroxy-1-thionaphthene are boiled on the reflux condenser in 25 parts of glacial acetic acid with 35 parts of the 2' (para-dimethylamino) anile of the 4-bromonaphthelene-3.2-(2'.3'-diketodihydro-1'-thiophene) of the farmula:

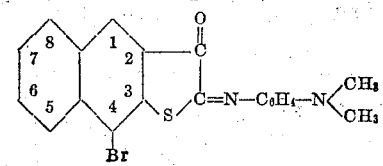

until the formation of the dyestuff has ceased. The product is then cooled and the dyestuff separated from the glacial acetic acid. It forms a violet powder dissolving in hot concentrated sulfuric acid to a green solution and giving a vat from which cotton is dyed a violet tint.

Most probably it corresponds to the following formula:

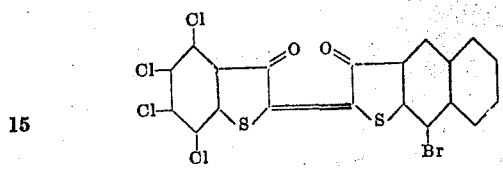

In the following claims the term "cyclic ortho-diketone" is intended to comprise also the substitution products and the reactive α-derivatives of the cyclic ortho-diketones.

We claim:

1. Process of preparing indigoid dyestuffs which comprises condensing a 4.5.6.7-tetra-halogen-3-hydroxy-1-thionaphthene with a cyclic ortho-diketone.

2. Process of preparing indigoid dyestuffs which comprises condensing a 4.5.6.7-tetra-halogen-3-hydroxy-1-thionaphthene with an isatin.

3. Process of preparing indigoid dyestuffs which comprises condensing a 4.5.6.7-tetra-halogen-3-hydroxy-1-thionaphthene with an isatin-α-derivative.

4. Process of preparing indigoid dyestuffs which comprises condensing a 4.5.6.7-tetra-halogen-3-hydroxy-1-thionaphthene with a 5.7-dihalogenisatin.

5. Process of preparing indigoid dyestuffs which comprises condensing a 4.5.6.7-tetra-halogen-3-hydroxy-1-thionaphthene with a 5.7-dihalogenisatin-α-derivative.

6. Process of preparing indigoid dyestuffs which comprises condensing 4.5.6.7-tetra-chlor-3-hydroxy-1-thionaphthene with a cyclic ortho-diketone.

7. Process of preparing indigoid dyestuffs which comprises condensing 4.5.6.7-tetra-chlor-3-hydroxy-1-thionaphthene with an isatin.

8. Process of preparing indigoid dyestuffs which comprises condensing 4.5.6.7-tetra-chlor-3-hydroxy-1-thionaphthene with an isatin-α-chloride.

9. Process of preparing indigoid dyestuffs which comprises condensing 4.5.6.7-tetra-chlor-3-hydroxy-1-thionaphthene with a 5.7-dichlorisatin.

10. Process of preparing indigoid dyestuffs which comprises condensing 4.5.6.7-tetra-chlor-3-hydroxy-1-thionaphthene with a 5.7-dichlorisatin-α-chloride.

11. As new products indigoid dyestuffs having the following atom-grouping

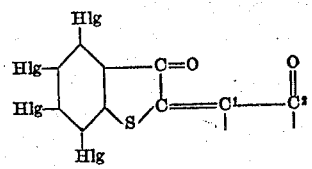

wherein $C^1$ and $C^2$ represent carbon atoms belonging to the residue of a cyclic ortho-diketone, said products forming brown to violet powders, which are soluble in hot concentrated sulfuric acid and dye cotton tints of excellent properties as to fastness.

12. As new products indigoid dyestuffs having the following atom-grouping:

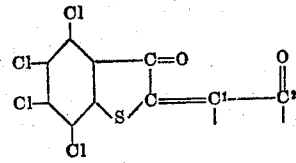

wherein $C^1$ and $C^2$ represent carbon atoms belonging to the residue of a cyclic ortho-diketone, said products forming brown to violet powders, which are soluble in hot concentrated sulfuric acid and dye cotton tints of excellent properties as to fastness.

13. As new products the indigoid dyestuffs of the general formula:

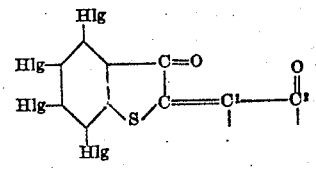

wherein $C^1$ and $C^2$ represent carbon atoms belonging to the five membered ring of an isatin residue.

14. As new products the indigoid dyestuffs of the general formula:

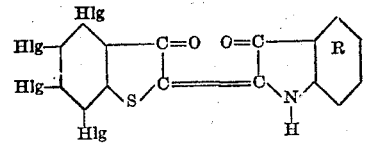

wherein the nucleus R may be substituted by halogen.

15. As new products the indigoid dyestuffs of the general formula:

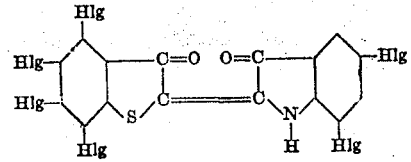

16. As a new product the indigoid dyestuff of the formula:
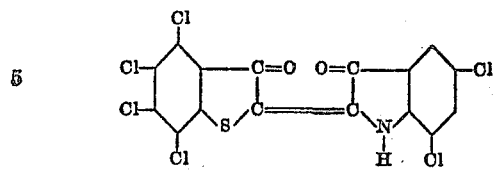
forming a violet powder and dyeing cotton a violet tint of excellent properties as to fastness.
In testimony whereof, we affix our signatures.
ERWIN HOFFA.
HANS HEYNA.
FRITZ MÜLLER.